United States Patent Office 2,696,100
Patented Dec. 7, 1954

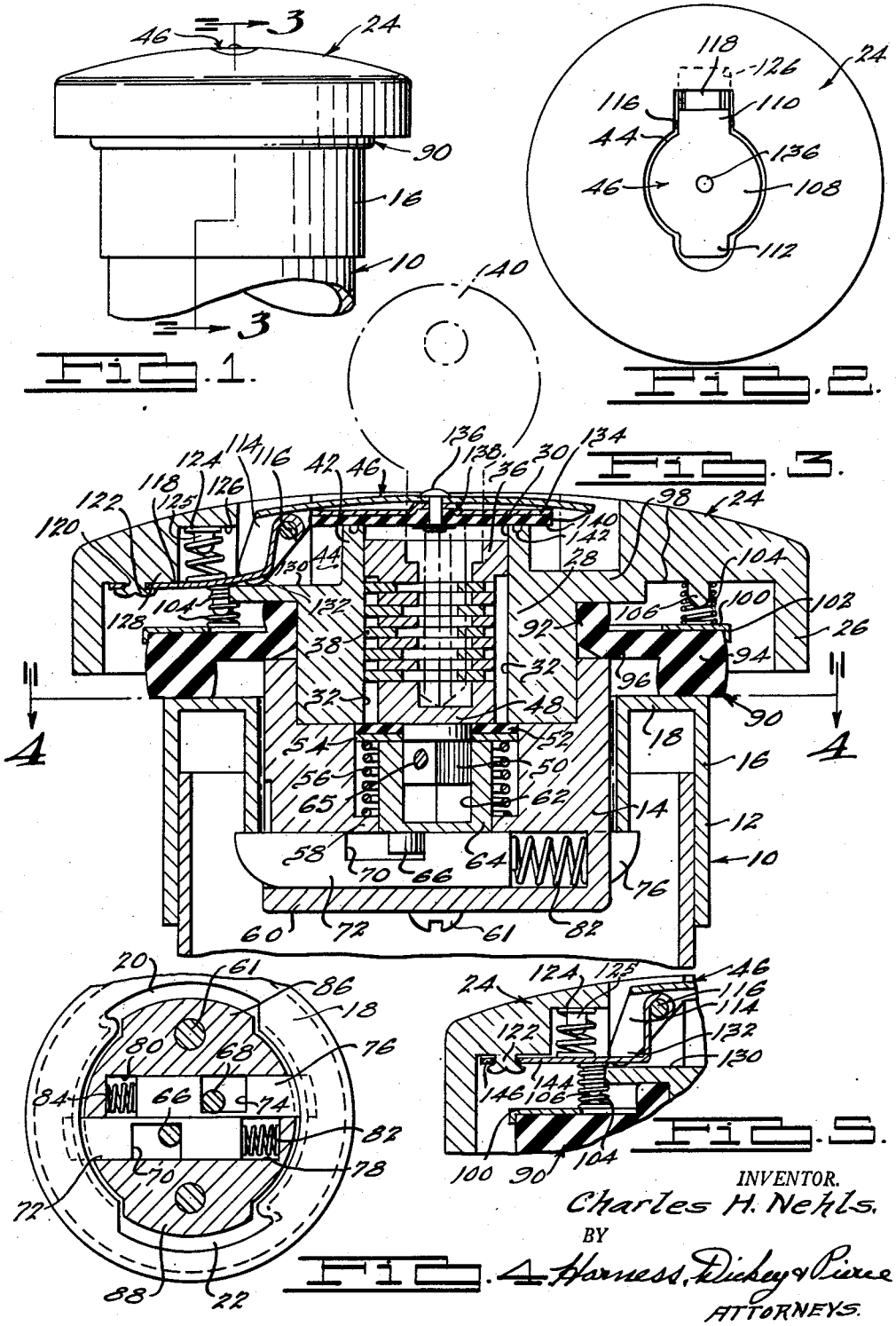

2,696,100

CAP CONSTRUCTION

Charles H. Nehls, Detroit, Mich.

Application March 9, 1953, Serial No. 341,015

8 Claims. (Cl. 70—455)

This invention relates to removable and replaceable cap-type closures for tanks and other receptacles and, more particularly, to an improved locking cap adapted for use in sealing the filler neck of an automotive vehicle fuel tank or the like.

An object of the invention is to provide an improved cap which incorporates a locking mechanism designed for key release that effectively prevents unauthorized removal of the cap and which also incorporates an improved dust cover for preventing the entrance of dirt, moisture and other foreign matter into the locking mechanism.

Still another object of the invention is to provide an improved locking cap which facilitates the dissipation of moisture which may come in contact with components of the cap thereby reducing the tendency of such components to corrode.

Yet another object of the invention is to provide an improved locking cap that is pleasing in appearance, rugged in construction, economical to manufacture, durable and reliable in operation.

The above as well as other objects and advantages of the invention will become apparent from the following description, taken in conjunction with the accompanying drawing wherein:

Figure 1 is an elevational view of a locking cap constructed in accordance with one form of the present invention and showing the same installed on a fragmentarily illustrated filler neck such as that conventionally provided on an automotive vehicle fuel tank;

Fig. 2 is a top plan view of the structure illustrated in Fig. 1;

Fig. 3 is a diametric sectional view, on an enlarged scale, taken substantially on the line 3—3 of Fig. 1 and looking in the direction of the arrows;

Fig. 4 is a horizontal sectional plan view, taken substantially on the line 4—4 of Fig. 3 and looking in the direction of the arrows; and Fig. 5 is a fragmentary vertical sectional view of a locking cap constructed in accordance with another form of the invention.

Referring to the drawing, a neck of a receptacle is illustrated, generally designated 10, which may be considered to be the filler neck of a fuel tank of an automotive vehicle although it will be understood that the invention is applicable to other uses. The neck is provided at its outer end with a return bent, cylindrical finishing ring 12, which is substantially U-shaped in section, the flanges 14 and 16 of the finishing ring extending substantially parallel with the neck while the web portion 18 extends inwardly. The flanges 14 and the web 18 are partially cut away at diametrically opposite positions, as indicated at 20 and 22. Such cut away portions have inclined downturned margins and are of a form commonly provided on automotive vehicle fuel tank filler necks to permit the application of a cap of the bayonet locking type, although the cap of the present invention is not of the bayonet locking type, such neck construction being merely shown in order to illustrate the applicability of my improved cap thereto.

The cap includes a body portion, generally designated 24, which may be formed as a die casting and which is provided with a downwardly extending skirt portion 26 which spacedly overhangs the neck. While in the preferred construction the outer surface of the cap is shown as being relatively smooth, it will be understood that such surfaces may be configured or altered in shape to suit the wishes of the designer.

A centrally disposed hub portion 28 is formed integrally with the body 24 and extends downwardly therefrom, as viewed in Fig. 3. A lock cylinder 30, having a pair of diametrically opposed, longitudinally extending grooves 32 formed in the inner walls thereof, is provided in the hub portion 28 and is adapted to accommodate a plug 36. The plug 36 includes conventional spring biased plate tumblers 38 which normally project into the grooves 32 and the tumblers are provided with apertures through which a key 40 passes to retract the tumblers from the grooves after which the plug is rotatable in the cylinder 30 through the agency of the key in the conventional manner.

The outer end portion 42 of the hub 28, at the top of the cap, projects into a well or depression 44 provided in the cap and the upper key-receiving end of the plug 36 is exposed but is adapted to be covered by a dust cover, generally designated 46, the construction of which will be described hereinafter in greater detail.

The lower end of the plug 36 extends downwardly beyond the end of the key 40 and is closed by a bottom wall 48 which prevents the passage of fuel through the keyhole. An enlarged, centrally disposed rectangular or non-circular lug 50 extends downwardly from the lower surface of the bottom wall and a ring-shaped sealing member 52, formed of a soft, rubber-like material preferably of a synthetic character which will not be affected by the fuel or other matter stored in the tank, is fitted over the lug 50 so that the inner portion of the sealing member bears against the lower surface of the end wall 48 while the outer portion bears against the lower end of the hub portion 28 of the cap. Pressure is applied to the sealing member 52 by a similarly shaped washer 54 biased by a coiled spring 56.

Such a construction prevents the escape of fuel through the cylinder 30 along the periphery of the plug and also functions to retain the plug in the cylinder. From the above description it will be appreciated that such a construction is well adapted for use on automotive vehicles wherein the outer end of the filler neck is disposed near the top of the fuel tank and prevents the escape of fuel from the filler neck when the fuel level in the tank changes rapidly because of sudden starts, stops and turning of the vehicle during the operation thereof.

The lower end of the spring 56 bears against an internal shoulder 58 provided in a housing 60 which is secured to the hub 28 by screws 61 so that the housing 60 and the hub 28 complement one another to form a substantially cylindrical, downwardly extending central portion of the cap which projects into the filler neck.

The lug 50 projects into a similarly shaped recessed portion 62 provided in a cap 64 and is retained therein by a pin 65 which extends through the lug 50 and the walls of the cap 64. At its lower end, the cap 64 is provided with a pair of projecting pins 66 and 68. The pin 66 projects into an actuating notch 70 in a latch bolt 72 while the pin 68 projects into a similar notch 74 in a latch bolt 76. The latch bolts 72 and 76 are slidable in slideways 78 and 80, respectively, formed in a housing 60 and are urged outwardly in opposite directions by compression springs 82 and 84, respectively, which normally project the bolts to positions in which they extend outwardly through suitable openings provided in the sides of the housing 60 and underlie the filler neck flange portion 14 to prevent removal of the cap. The latch bolts are simultaneously retractable to permit removal of the cap in response to the rotation of the plug 36.

The housing 60 is also provided with radially projecting side portions 86 and 88 adapted to extend into the cutout areas 20 and 22.

The projecting portions 86 and 88 key the cap against rotation with respect to the filler neck and assure proper positioning of the cap upon the filler neck in such a manner that the latch bolts will engage the portions of the flange 14 between the cutout areas 20 and 22.

A sealing member, generally designated 90, formed of rubber-like material preferably of a synthetic character which will be unaffected by the fuel or other matter to be stored in the tank, is housed inside the skirt portion 26 of the cap and serves to prevent the escape of fuel around the periphery of the cap. The sealing member 90 is of the cross-sectional contour illustrated in Fig. 3 and includes a pair of concentrically disposed axially spaced sleeve portions 92 and 94 integrally joined at the inner ends by a radially extending, relatively flat web portion 96. The sleeve portion 92 snugly fits the hub portion 28 and the upper end bears against the lower surface of the shoulder 98 of the cap while the inner end portion of the web 96 engages the upper end of the housing 60. The lower end of the sleeve portion 94 projects downwardly in spaced relationship to both the skirt 26 and the hub 28 and is adapted to bear against the web portion 18 of the finishing ring when the cap is positioned downwardly on the filler neck far enough to cause the latch bolts 72 and 76 to engage the neck flange 14. The sealing member 90 thus forms a seal with the hub portion 28, the shoulder 98, the upper end of the housing 60 and the web portion 18 of the finishing ring.

A metallic washer 100 having a downwardly projecting rim 102 bears against the upper surface of the web portion 96 of the sealing member while the rim 102 serves to hold the washer 100 in the proper position.

Sealing pressure is applied to the sealing member by the springs 104 which are spaced radially around the hub portion 28 at approximately ninety degree increments intermediate the hub portion and the skirt 26. The lower end of each spring bears against the washer 100 while the upper end portions of the springs are fitted on the downwardly projecting studs 106 which are preferably cast integral with the body portion 24.

As previously mentioned, the present invention also provides a dust cover, generally designated 46. The dust cover may be formed as a stamping and includes a substantially circular body portion 108 having integral, diametrically opposed, radially extending tangs 110 and 112, the upper surfaces of which are substantially coplanar with the upper surface of the body portion 108. The dust cover is disposed in the depression 44 and the tang 112 facilitates the manual opening and closing of the dust cover.

The tang 110 is provided with a pair of spaced, substantially parallel ears 114 which are housed in one end of the depression 44 and which extend downwardly from the sides of the tang while a horizontally extending pivot pin 116 extends transversely between the ears 114. One end of a relatively short leaf spring 118 is return bent around the pivot pin 116 while the distal end of the spring 118 is provided with an aperture 120 which snugly fits over a lug 122 formed integral with the cap, the lug being peened or otherwise headed to retain the spring 118. The spring 118, which constitutes a supporting bearing for the pivot pin 116 and also urges the dust cover downwardly, provides the only connection between the dust cover 46 and the cap 24. The effort exerted by the relatively short leaf spring 118 is augmented by a coiled spring 124 that is disposed in an internal recessed portion 126 which communicates with the depression 44 in the cap and which is open at the bottom outside the sealing gasket 90. Recess 126 is also wider than the flat spring 118, as brought out in Fig. 2, which not only provides clearance for the flexing of the spring, but permits any moisture which enters the depression 44 to drain through the recessed portion 126. Such a construction prevents the moisture from reaching the components of the cap which are disposed inside of the sealing member and prevents corrosion of such components. Dissipation of the moisture is also facilitated since the moisture tends to evaporate in the air currents which flow through the space between the sealing member 90 and the skirt 26.

The upper end of the coiled spring 124 is fitted over a lug 125 and bears against the cap while the lower end of the coiled spring 124 bears against the leaf spring 118. The coiled spring 124 functions to give a larger bending radius to the spring 118 so as to substantially prevent fatigue failure of the leaf spring along the line where it would normally bear against the edge of the shoulder 128 of the cap and the coiled spring 124 also functions to give added spring action to the leaf spring 118.

The sides of the tangs 110 and 112 of the dust cover are substantially straight and parallel and the depression 44 is similarly shaped while the bottom wall 130 of the depression 44 extends in a plane substantially perpendicular to the sides thereof. The ears 114, when viewed in side elevation, are of generally right-triangular shape, transversely aligned with one another with the altitude side of each triangle integrally joined to the tang 110. The corners 132 at the junction of the hypotenuse and the base are rounded while the axis of the pivot pin 116 extends through the ears at a point near, but spaced from, the junction of the altitude with the hypotenuse.

The base sides of the substantially right-triangularly shaped ears extend angularly downward and outwardly away from the lock cylinder 30 when the dust cover is closed. When the dust cover 46 is closed, only the outer corner portions 132 bear downwardly against the bottom wall 130 of the recessed portion 44 and the corners 132 lie outside of a vertical, transversely extending plane projected along the axis of the pivot pin 116.

The reaction due to the downward force exerted through the pivot pin 116 as a result of the combined efforts of the leaf spring 118 and the coiled spring 124 results in an upward component of force in the form of a reaction upon the corners 132 of the ears 114 at their points of engagement with the bottom wall 130 of the recessed portion 44. Such components of force produce a rocking couple which tends to rock the dust cover in a clockwise direction about the pin 116, as the parts are viewed in Fig. 3, so that the dust cover is spring urged toward the closed position and tends to close with a snap action so long as the corners 132 lie outside a vertical plane coinciding with the path of movement traveled by the axis of the pin 116 during the arcuate movement of the inner end portion of the leaf spring 118. When the dust cover is raised to a position such that the corners 132 move inwardly past and to a position in which they lie inside of the vertical plane coinciding with the pivot pin 116, the combined efforts exerted by the coiled spring 124 and the leaf spring 118 produce a rocking couple in the opposite direction with the result that the dust cover is urged in a counterclockwise direction so that the cap tends to open with a snap action and is retained in the open position. During opening and closing movement of the dust cover, the corners 132 travel over the bottom wall 130 of the recessed portion 44. Since the inner end portion of the leaf spring 118 moves arcuately, the entire dust cover can move vertically and in a radial direction during opening and closing. This permits the corners 132 to move freely over the bottom wall of the recessed portion 44 even though the recessed portion is proportioned to fit the dust cover closely when the dust cover is closed.

A disk-shaped member 134, which is of slightly smaller diameter than the body portion 108 of the dust cover, is secured to such body portion by a rivet 136. The disk-shaped member 134 is provided with an upwardly extending central portion 138 which serves to maintain the radially extending flange portion of the member 134 in spaced relationship from the lower surface of the body portion 108. The disk-shaped member 134 serves as a backing for a resilient sealing gasket 140 formed of a soft, rubber-like material, the gasket 140 also being retained by the rivet 136. The gasket 140 is of sufficient diameter to overlie the ends of the upwardly projecting outer end portion 42 of the hub portion 28 and the gasket 140 is pressed downwardly against the end of the upwardly projecting portion 42 when the dust cover is closed to form a seal therebetween. The gasket is deformed slightly because of the compressive action of the leaf spring 118 and the coiled spring 124 and prevents the entrance of moisture, dirt and other foreign material into the lock cylinder 30 and the plug 36. An annular groove 142 is formed in the end of the upwardly projecting portion 42 so as to reduce the area thereof, thereby increasing the unit pressure on the gasket 140 and increasing the effectiveness of the seal.

The depth of the depression 44 and the height of the upwardly projecting portion 42 are so proportioned to the dimensions of the ears 114 that when the dust cover is closed, it lies flat and the top of the dust cover lies in substantially the same plane as the top of the cap 24 and of rim 42. However, any slight inaccuracy in this respect is offset by the resiliency of the gasket 140 and the resilient manner in which it is opposed in relation to the end of the upwardly projecting portion 42. Disk 134 is also limitedly rockable on rivet 136 so the disk and gasket washer 140 may adjust to the plane of rim 42.

The hole in gasket 140 is slightly stretched over the stem of rivet 136 to provide a seal at such point, and each of gaskets 52, 90 is also snugly fitted on the part embraced thereby.

Another embodiment of the invention is illustrated in Fig. 5. In this form of the invention, the dust cover 46 is secured to the cap 24 by a link 144, the inner end portion of which is bent upwardly and then return bent over the pivot pin 116 which extends between the ears 114. The outer end portion of the link is provided with an aperture 146 which loosely fits the lug 122. The link is retained by the headed portion of the lug and the loose fit of the link on the lug provides, in effect, a pivotal connection therebetween. The coiled spring 124 is interposed between the link 144 and the cap 24 and furnishes all of the spring effort which the link applies to the pivot pin 116 and consequently the dust cover 46. The reactive force of the spring 124 produces a rocking couple which tends to rock the dust cover in a clockwise direction about the pin 116, as viewed in Fig. 5, so that the dust cover is spring urged toward the closed position and tends to close with a snap action so long as the corners 132 of the ears 114 lie outside a vertical plane coinciding with the axis of the pin 116. When the dust cover is raised to a position so that the corners 132 move inwardly past and to a position inside of such a vertical plane, the coiled spring 124 produces a rocking couple which tends to move the dust cover in a counterclockwise direction with the result that the dust cover tends to open with a snap action and is maintained in the open position.

While preferred embodiments of the invention have been shown and described, it will be understood that various changes and modifications may be made without departing from the spirit and scope of the invention.

What is claimed is:

1. In a construction having a supporting body defining an opening, a cover for the opening, means for pivotally connecting said cover to the body for movement to and from covering engagement with respect to a surface portion of the body surrounding the opening comprising a link, one end of said link pivotally connected to one edge portion of said cover, the other end of said link projecting outwardly from said cover and supported by said body, said cover having an over-center reaction lug slidably engageable with said body and movable in response to swinging movement of the cover to selectively engage the body upon opposite sides of the axis of the pivotal connection of said cover to said link, and spring means reacting on said link to produce a rocking couple tending to urge said cover toward the closed position when said lug engages said body at a position outwardly spaced from said axis.

2. In a construction having a supporting body defining an opening, a cover for the opening, means for pivotally connecting said cover to the body for swinging movement to and from covering engagement with respect to a surface portion of the body surrounding the opening comprising a resilient link, one end of said link pivotally connected to one edge portion of said cover, the distal end portion of said link projecting outwardly from said cover and fixed to said body, an over-center reaction lug carried by said cover and slidably engageable with said body, in response to swinging movement of said cover, to engage said body upon opposite sides of the axis of the pivotal connection of said cover to said link, and spring means reacting on said link to produce a rocking couple tending to hold said cover in a closed position when said lug is at an extreme limit of its travel upon the side of said axis distant from said opening.

3. In a construction including a supporting body having a depression therein, said body having a re-entrant sealing lip, a cover for said lip, means for pivotally connecting said cover to said body for swinging movement to and from covering engagement with respect to the sealing lip comprising a link extending outwardly from one side of said cover, the outer end of said link supported by said body, the inner end of said link pivotally connected to said side portion of said cover, an over-center reaction lug carried by said cover and housed in said depression, said lug slidably engageable with said body in response to swinging movement of said cover, and spring means reacting on said link to urge said cover toward the closed position when said lug engages said body at a position outwardly spaced from the axis of said pivotal connection.

4. A cap construction including, in combination, a supporting body having a depression therein, said body having a centrally disposed re-entrant sealing lip, a displaceable cover for said lip, means pivotally connecting said cover to said body for swinging movement from an open position to a closed position comprising a link extending outwardly from the cover, one end of said link fixed to said body, the other end of said link pivotally connected to one edge portion of said cover, an over-center reaction lug carried by said cover and housed in said depression, said lug slidably engageable with said body in response to swinging movement of said cover, and spring means reacting on said link to urge said cover toward the closed position when said lug engages said body at a position outwardly spaced from the axis of said pivotal connection.

5. A cap construction including, in combination, a supporting body having a depression therein, said body having a centrally disposed re-entrant sealing rim, a displaceable cover for said rim, means for pivotally connecting said cover to said body for swinging movement to and from covering engagement with respect to the sealing rim comprising a relatively inflexible link extending outwardly from said cover, the outer end of said link pivotally connected to said body, the inner end of said link pivotally connected to one edge portion of said cover, an over-center reaction lug carried by said cover and housed in said depression, said lug slidably engageable with the bottom wall of said depression in response to swinging movement of said cover, and spring means reacting on said link to urge said cover toward the closed position when said lug engages the bottom wall of said depression at a position outwardly spaced from the axis of said pivotal connection to said cover.

6. In a cap construction having a supporting body provided with a depression therein, said body having a centrally disposed outwardly projecting re-entrant sealing rim, a displaceable cover for said rim, means for pivotally connecting said cover to said body for swinging movement to and from covering engagement with respect to the sealing rim comprising a relatively short leaf spring extending outwardly from said cover, one end of said leaf spring fixed to said body, the other end of said flat spring pivotally connected to one side portion of said cover, an over-center reaction lug carried by said cover and housed in said depression, said lug slidably engageable with said body in response to swinging movement of said cover, and additional spring means reacting on said leaf spring to urge said cover toward the closed position when said lug engages said body at a position outwardly spaced from the axis of said pivotal connection, said additional spring means performing the double function of increasing the spring action of said leaf spring and increasing the bending radius of said leaf spring.

7. A cap construction comprising, in combination, a supporting body having a depression therein, said body having a centrally disposed outwardly projecting re-entrant sealing rim, a displaceable cover for said rim, means pivotally connecting said cover to said body for swinging movement from an open position to a closed position comprising a link extending radially from the cover, one end of said link supported by said body, the other end of said link pivotally connected to one side portion of said cover, an over-center reaction lug carried by said cover and housed in said depression, said lug slidably engageable with said body in response to swinging movement of said cover, spring means reacting on said link to urge said cover toward the closed position when said lug engages said body at a position outwardly spaced from the axis of said pivotal connection, and a resilient gasket carried by said cover, said gasket engaging said rim to form a seal therebetween when said cover is closed.

8. A cap construction comprising, in combination, a supporting body having a depression therein, said body having a centrally disposed outwardly projecting re-entrant sealing rim, a displaceable cover for said rim, means for pivotally connecting said cover to said body for swinging movement to and from the open and closed positions comprising a relatively inflexible link extending radially from said cover, the outer end of said link pivotally connected to said body, the inner end of said link pivotally connected to one side portion of said cover, an over-center reaction lug carried by said cover and housed in said depression, said lug slidably engageable with the bottom wall of said depression in response to swinging movement of said cover, spring means reacting on said link to urge said cover toward the closed position when said lug engages the bottom wall of said depression at a position outwardly spaced from the axis of said pivotal connection to said cover, and a resilient gasket carried by said cover, said gasket engaging said im to form a seal therebetween when said cover is closed.

References Cited in the file of this patent

UNITED STATES PATENTS

| Number | Name | Date |
|---|---|---|
| 1,648,726 | English | Nov. 8, 1927 |
| 1,982,956 | Jacobi | Dec. 4, 1934 |
| 2,275,022 | Thomas | Mar. 3, 1942 |

FOREIGN PATENTS

| Number | Country | Date |
|---|---|---|
| 915,937 | France | Aug. 15, 1946 |